Figure 1:
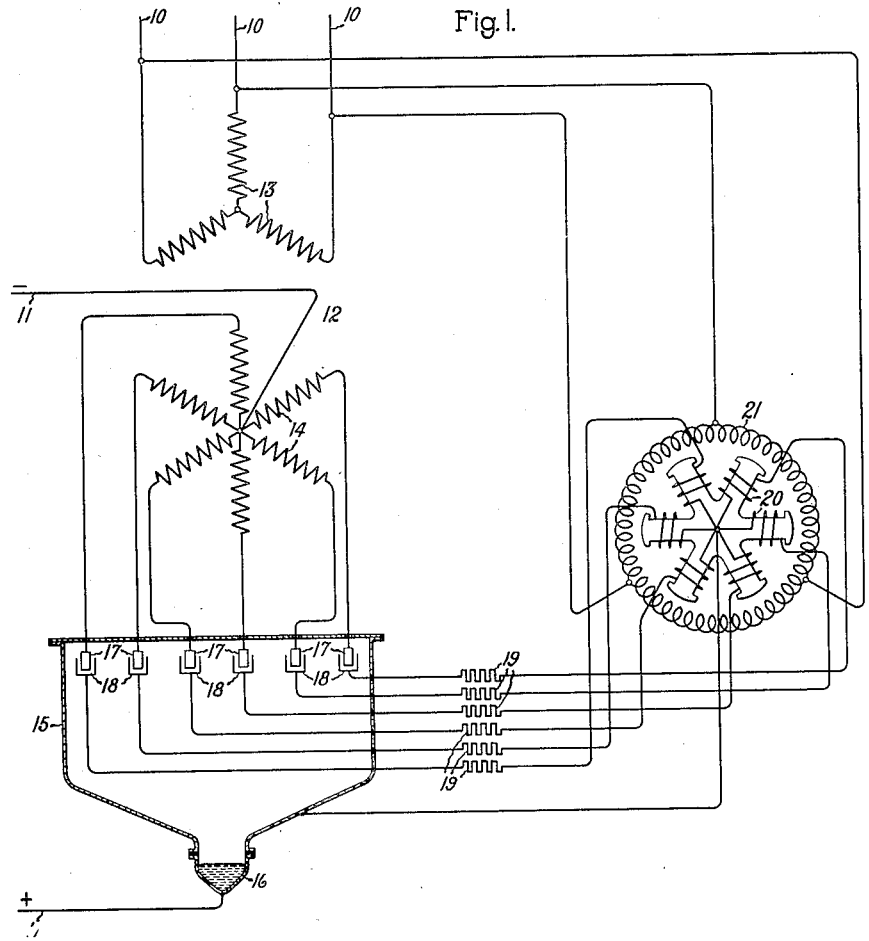

Jan. 1, 1935. E. H. REID 1,986,287
ELECTRIC REGULATING SYSTEM
Original Filed March 9, 1932

Inventor:
Eugene H. Reid,
by *Charles E. Tullar*
His Attorney.

Patented Jan. 1, 1935

1,986,287

UNITED STATES PATENT OFFICE 1,986,287

ELECTRIC REGULATING SYSTEM

Eugene H. Reid, Schenectady, N. Y., assignor to General Electric Company, a corporation of New York Application March 9, 1932, Serial No. 597,759
Renewed June 2, 1934

7 Claims. (Cl. 175—363)

My invention relates to electric regulating systems, and more particularly to such systems including electric valves for regulating the energy transmitted between direct and alternating current circuits.

Heretofore there have been proposed various arrangements including an electric valve for transmitting energy between direct and alternating current circuits, in which an electrical condition of one of the circuits is controlled or regulated in response to predetermined circuit conditions. It has been found that such regulation may be simply and satisfactorily effected by applying to the grid of the electric valve an alternating potential displaced in phase with respect to its anode potential, and a unidirectional bias potential variable in magnitude. Regulation of this type is described and illustrated in United States Letters Patent Nos. 1,654,937 and 1,655,040, granted January 3, 1928 upon the applications of H. B. Knight and E. F. W. Alexanderson, respectively. Such control arrangements of the prior art have, however, required bias batteries or other sources of bias potential which are objectionable from the standpoint of involving additional equipment and maintenance costs. It has been found, however, that, when utilizing electric valves of the vapor electric discharge type, a unidirectional potential exists between a conductive element in contact with the ionized space of the valve and the cathode, which varies in magnitude in accordance with the current transmitted by the device, and which may thus serve as a source of unidirectional bias potential for regulating the current transmitted by the valve. In cases where the discharge device comprises a metallic envelope with an insulated cathode, the envelope itself may be used as the conductive element in contact with the ionized vapor.

It is an object of my invention, therefore, to provide an improved electric regulating system including a vapor electric discharge valve which will overcome the above mentioned disadvantages of the arrangements of the prior art and which will be simple and reliable in operation.

It is another object of my invention to provide an improved electric regulating system including a vapor electric discharge valve in which the desired regulation is effected in response to the ionization of the valve.

It is a further object of my invention to provide an improved regulating system including a vapor electric discharge valve comprising a conductive envelope and an insulated cathode, in which the regulation is effected in response to variations in the potential therebetween.

In accordance with my invention, direct and alternating current circuits are interconnected through a vapor electric discharge valve provided with a grid for controlling the current transmitted therethrough. There is provided a control circuit for the grid including an alternating potential derived from the alternating current circuit and variable in phase with respect thereto, to control the energy transmitted between the power circuits. The return connection of the grid circuit, rather than being connected to the cathode, as is customary in the arrangements of the prior art, is connected to a conductive element in contact with the ionized vapor and insulated from the cathode, such for example, as a metallic envelope or casing of the discharge valve.

Figure 2:
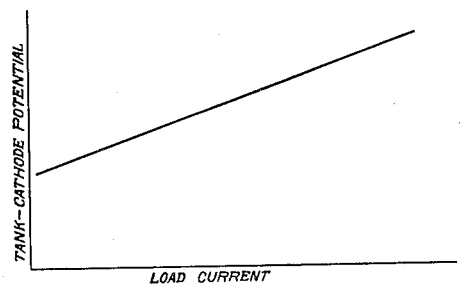

For a better understanding of my invention, together with other and further objects thereof, reference is had to the following description taken in connection with the accompanying drawing, and its scope will be pointed out in the appended claims. Fig. 1 of the accompanying drawing illustrates an arrangement for transmitting energy between a three phase alternating current circuit and a direct current circuit, while Fig. 2 illustrates the relation between the anode current and the potential between the cathode and the conductive envelope of a discharge valve of the type employed in my invention.

Referring now to the drawing, there is illustrated an apparatus for transmitting energy between a three phase alternating current circuit 10 and a direct current circuit 11. This apparatus comprises a transformer 12, consisting of a three phase primary winding 13 connected to the circuit 10 and a six phase secondary winding 14, and a vapor electric rectifying apparatus which may be of any of the several types well known in the art, although I have illustrated by way of example, a single cathode, multiple anode, mercury pool rectifier comprising an envelope or tank 15, an insulated mercury pool cathode 16, a plurality of anodes 17, and a plurality of associated control grids 18. The rectifying apparatus and the polyphase windings 14 are connected in a conventional manner to secure half wave rectification; that is, the negative side of the direct current circuit 11 is connected to the neutral of the winding 14, while the positive side of the direct current circuit is connected to the cathode 16, and the several phase terminals of the winding 14 are connected to the anodes 17 of the rectifier.

In order to control the amount of energy transmitted between the power circuits 10 and 11, the several grids 18 are connected through current limiting resistors 19 to the several phases of a six phase secondary winding 20 of a rotary phase shifting transformer 21 energized from the alternating current circuit 10. The electrical neutral of the secondary winding 20 is connected directly to the metallic tank 15 as illustrated.

In explaining the operation of the above described apparatus, it will be assumed that the rotary phase shifting transformer 21 is so adjusted that the alternating potentials applied to the several grids 18 are retarded substantially behind the potentials of the anodes 17 and that a very light load is drawn by the direct current circuit 11. Under such conditions, the average voltage impressed upon the direct current circuit 11 will be substantially less than the maximum value, as will be well understood by those skilled in the art, or as explained in more detail in United States Letters Patent No. 1,654,949, granted January 3, 1928, upon the application of P. M. G. Toulon. As the load drawn by the direct current circuit 11 increases the average voltage of the circuit tends to decrease due to the natural regulation characteristics of the transformer 12 and the rectifying apparatus. However, it has been found that if the load current transmitted through the rectifying apparatus increases, the unidirectional potential existing between the tank 15 and the cathode 16 increases positively and substantially linearly. This relation is illustrated in Fig. 2 of the drawing. It will be noted that this unidirectional bias between the tank 15 and the cathode 16 is included in the several control circuits of the grids 18, with the result that each grid potential comprises an alternating potential displaced in phase with respect to its anode potential superposed on a unidirectional bias. With such an arrangement, as the unidirectional bias is increased positively, the point in each cycle at which the several anodes become conductive is progressively advanced, as is well understood by those skilled in the art, or as is explained in more detail in the above mentioned United States Letters Patent, Nos. 1,654,937 and 1,655,040. Hence, as the load on the apparatus increases, the unidirectional bias in the control circuits of the several grids increases as illustrated in Fig. 2, and the average voltage impressed upon the direct current circuit 11 is increased to compensate for the regulation drop in the apparatus, thus maintaining substantially constant voltage on the direct current circuit 11.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination of alternating and direct current power circuits, means for transmitting energy therebetween including a vapor electric discharge device comprising an anode, a cathode, and a control grid, and a control circuit for said grid including a source of alternating potential derived from said alternating current circuit, and a potential derived directly from the arc drop of said device.

2. The combination of alternating and direct current power circuits, means for transmitting energy therebetween including a vapor electric discharge device comprising an anode, a cathode, and a control grid, means for impressing upon said grid an alternating potential derived from said alternating current circuit and a unidirectional potential variable in accordance with the ionization of said discharge device to regulate the current transmitted through said discharge device, and means for varying the phase of said alternating potential to vary the regulation characteristic of the apparatus.

3. The combination of alternating and direct current power circuits, means for transmitting energy therebetween including a vapor electric discharge device comprising an anode, a cathode, a control grid, and a conductive element in contact with the ionizable vapor and insulated from said cathode, means for applying to said control grid a control potential, and means for superposing upon said control potential the potential between said conductive element and said cathode to regulate the current transmitted through said discharge device.

4. The combination of alternating and direct current power circuits, means for transmitting energy therebetween including a vapor electric discharge device comprising an anode, a cathode, a control grid, and a conductive element in contact with the ionizable vapor and insulated from said cathode, and means for applying to said control grid an alternating potential derived from said alternating current circuit and the potential between said conductive element and said cathode to regulate the current transmitted through said discharge device.

5. The combination of alternating and direct current power circuits, means for transmitting energy therebetween including a vapor electric discharge device comprising a conductive envelope, an anode, an insulated cathode, and a control grid mounted therein, and means for applying to said control grid an alternating potential derived from said alternating current circuit and the potential between said conductive element and said insulated cathode to regulate the current transmitted through said discharge device.

6. The combination of alternating and direct current power circuits, means for transmitting energy therebetween including a vapor electric discharge device comprising a conductive envelope, an anode, an insulated cathode, and a control grid mounted therein, a connection between said grid and said envelope including an alternating potential derived from said alternating current circuit, and means for varying the phase of said alternating potential to control the current transmitted through said discharge device.

7. A rectifying system comprising an alternating current supply circuit, a direct current load circuit, vapor electric rectifying apparatus interconnecting said circuits and comprising an anode, a cathode, a control grid, and a conductive element in contact with the ionizable vapor and insulated from said cathode, and means for maintaining constant the voltage of said direct current circuit comprising a control circuit for said grid including a control potential and the potential between said conductive element and said cathode.

EUGENE H. REID.